Feb. 3, 1942.   J. L. DRAKE   2,272,061
HOLLOW GLASS BUILDING BLOCK
Filed Feb. 10, 1939   2 Sheets-Sheet 1

Inventor
JOHN L. DRAKE.
By Frank Fraser
Attorney

Feb. 3, 1942.   J. L. DRAKE   2,272,061
HOLLOW GLASS BUILDING BLOCK
Filed Feb. 10, 1939   2 Sheets-Sheet 2

Inventor
JOHN L. DRAKE.
By Frank Fraser
Attorney

Patented Feb. 3, 1942

2,272,061

UNITED STATES PATENT OFFICE 2,272,061

HOLLOW GLASS BUILDING BLOCK

John L. Drake, Toledo, Ohio, assignor to Libbey-Owens-Ford Glass Company, Toledo, Ohio, a corporation of Ohio Application February 10, 1939, Serial No. 255,722

2 Claims. (Cl. 72—41)

The present invention relates to improvements in multi-part hollow glass building blocks and is particularly concerned with those types of blocks composed of two sections permanently secured to one another.

An important object of the invention is the provision of an improved form of seal for uniting the two sections of the block to provide a hermetically sealed unit.

Another important object of the invention is the provision of a colored hollow glass building block of the above character wherein the coloring material, in addition to giving the desired ornamental effect, also serves as the medium for uniting the two sections of the block together.

A further important object of the invention is the provision of a novel method of coloring the two sections of the block after they have been formed and wherein the coloring material is fired upon the glass surfaces and the sections of the block simultaneously united with one another.

Other objects and advantages of the invention will become more apparent during the course of the following description, when taken in connection with the accompanying drawings.

In the drawings, wherein like numerals are employed to designate like parts throughout the same:

Figure 9:
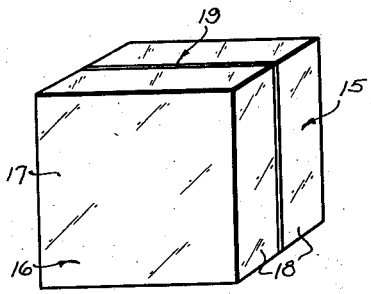
Fig. 9 is a perspective view of a finished block having the coloring material applied to the two sections thereof in the manner shown in Fig. 5.

With reference now to the drawings, and particularly to Fig. 9, there is illustrated a hollow glass building block of rectangular form composed of two substantially similar preformed cup-like sections or halves 15 and 16. Each section includes a bottom wall 17 and four side walls 18; the two sections being permanently united with one another along the edge portions thereof as indicated at 19.

Figure 10:
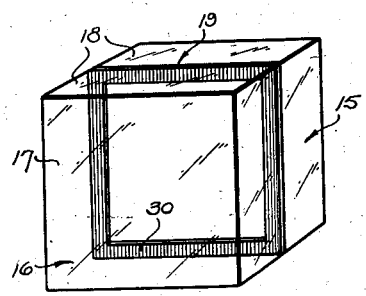
Fig. 10 is a perspective view of a finished block having the coloring material applied to the edge portions only of the sections as shown in Fig. 6.

In Fig. 10 is illustrated a form of block similar to that disclosed in Fig. 9 and having the same reference numerals applied to corresponding parts thereof. The principal difference between the blocks of Figs. 9 and 10 is in the manner of application of the coloring material thereto, as will be more clearly hereinafter described, to provide blocks presenting different ornamental appearances.

Figure 1:
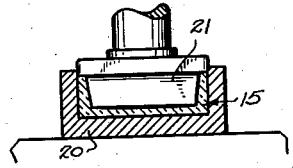
Fig. 1 is a fragmentary sectional view illustrating the shaping of one section of a hollow glass building block.
Figure 2:
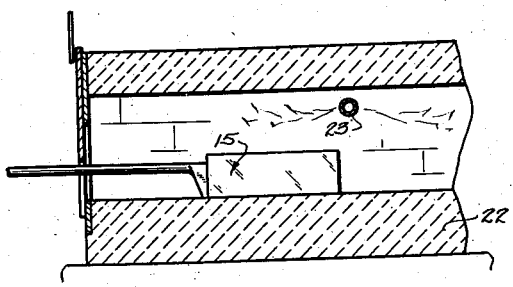
Fig. 2 is a vertical sectional view through a portion of a heated chamber in which the preformed block sections are annealed.

The two sections or halves 15 and 16 of the blocks may be formed according to any desired method and by any suitable apparatus. For example, each of the cup-like sections may be produced as shown in Fig. 1 from a measured quantity of molten glass which is deposited in a mold 20 and pressed to the desired shape by means of a plunger 21. After the block section has been formed, it is adapted to be properly annealed and this may be accomplished by removing it from the mold and placing it in a suitable annealing chamber 22 (Fig. 2) heated in any desired manner such as by burners or the like 23.

Figure 3:
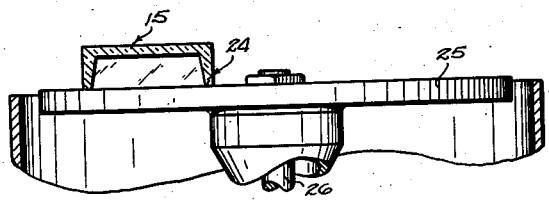
Fig. 3 is a fragmentary view illustrating the grinding of the edge portions of a block section after annealing.
Figure 4:
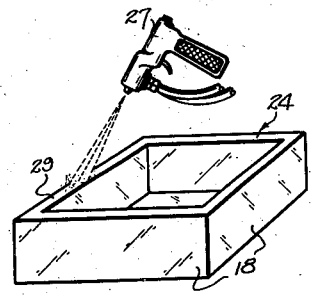
Fig. 4 is a perspective view illustrating one method of applying the coloring material to the block sections.

After the block section has been properly annealed, the edge portions 24 of the side walls 18 thereof are preferably ground or otherwise treated to provide roughened surfaces. This roughening of the edge portions may be performed upon a rotatable grinding wheel 25 (Fig. 3) mounted upon a vertical shaft 26 or by any other suitable grinding or roughening apparatus or method.

Following the roughening of the edge portions 24 of the block section, the coloring material is adapted to be applied to the glass. The coloring material used may be of any desired composition, such as a ceramic enamel, and is preferably sprayed upon the glass by means of a conventional spray gun 27, although other methods of application may be resorted to.

Figure 5:
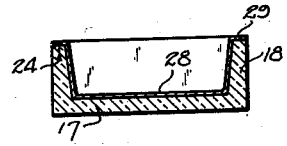
Figs. 5 and 6 are sectional views showing two different ways in which the coloring material may be applied to the block sections.

As shown in Fig. 5, a relatively thin layer of coloring material 28 is applied to the inner surfaces of the bottom and side walls 17 and 18 respectively of the block section and also to the edge portions 24 thereof as indicated at 29. On the other hand, in Fig. 6, the coloring material is applied to the edge portions 24 only of the block section as indicated at 30.

Figure 6:
Figure 7:
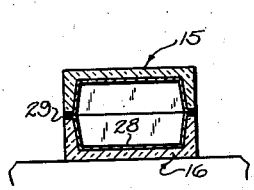
Fig. 7 is a sectional view through a block showing the two sections thereof properly assembled with one another.

After the coloring material has been applied to two block sections or halves either in the manner illustrated in Fig. 5 or Fig. 6, the block sections are properly associated with one another as in Fig. 7, at which time the layers of coloring material upon the edge portions 24 of the two block sections will contact one another. The assembled block sections are then adapted to be united with one another to form a hermetically sealed unit and, at the same time, the coloring material is adapted to be fired upon the glass.

The firing of the coloring material upon the glass and the uniting of the block sections may be simultaneously accomplished by placing the assembled sections in a suitable furnace 31 (Fig. 8) heated by burners or the like 32. The temperature within the furnace is adapted to be so controlled as to effect the firing of the coloring material upon the glass surfaces. Upon firing of the coloring material, the contacting color coats upon the edge portions of the block sections will be caused to fuse together as well as to the glass whereby the two sections of the block will be firmly and permanently united to one another to provide a hollow hermetically sealed unit.

From the above, it will be readily seen that the block can either be entirely colored by applying the coloring material thereto as in Fig. 5, or the edge portions 24 only thereof colored as in Fig. 6. In either case, the coloring material will be plainly visible through the walls of the block to give the desired color effect. A great variety of colors and their tints and shades may be used and the blocks may be made of transparent, semi-transparent or translucent glass.

Figure 11:
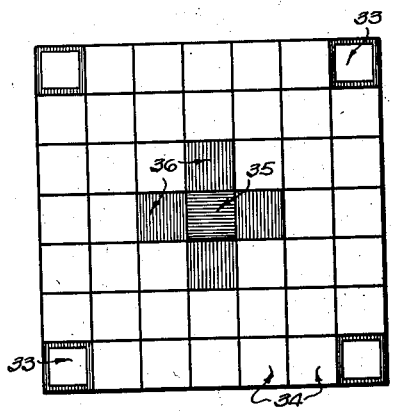
Fig. 11 is a diagrammatic view illustrating the use of the blocks herein provided in the construction of a wall.

The two forms of blocks shown in Figs. 9 and 10 can be used in the construction of a wall or wall facing to provide any desired coloring or decorating effect. By way of example, there is illustrated diagrammatically in Fig. 11 a rectangular wall provided at the four corners thereof with blocks 33 in which the coloring material is provided on the edge portions only of the block sections as in Fig. 10. The major part of the wall can be built of plain or uncolored blocks 34, while in the center of the wall a suitable design may be formed including a central block 35 of one solid color and surrounding block 36 of another or different colors. Obviously, numerous other arrangements can be employed to provide an attractive wall and to obtain interesting architectural effects so that the blocks herein provided are not limited to any particular use or in any special manner.

The plain or uncolored blocks 34 can be formed in the same way as the colored blocks. Also the two sections of the plain or uncolored blocks can be permanently united with one another by using a color clear or substantially color clear ceramic enamel or other suitable composition applied to the edge portions thereof, in the same manner that the colored material 30 is applied to the block sections in Fig. 10.

Figure 12:
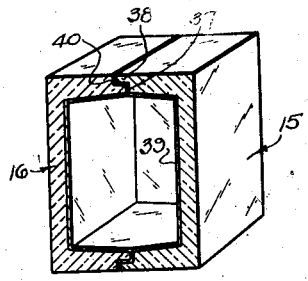
Fig. 12 is a perspective sectional view of a modified type of block embodying the invention.

In Fig. 12 is illustrated a slightly modified type of block wherein the edge portions of the two sections of the block are formed so that they overlap one another. Thus, the edge portion of each section is notched as at 37 to provide a recess for receiving the reduced edge portion 38 of the adjacent block section. The reduced edge portions 38 overlap one another and the coloring material may be applied to the inner surfaces of the bottom and side walls of the block sections as indicated at 39 as well as to the edge portions as indicated at 40 or to the edge portions only as described above.

Figure 13:
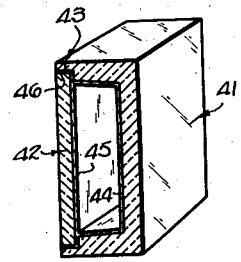
Fig. 13 is a perspective sectional view of another modified type of block also embodying the invention.
Figure 8:
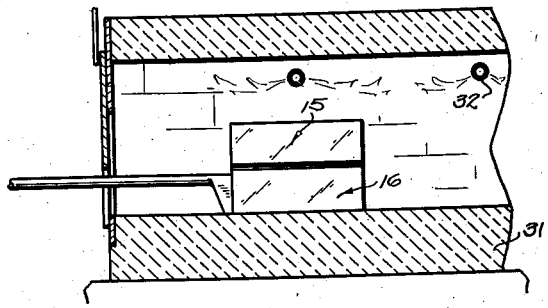
Fig. 8 is a vertical sectional view through a portion of a heating chamber in which the coloring material is fired upon the glass and the two sections of the block simultaneously joined together.

In Fig. 13 is illustrated another type of multipart hollow glass block embodying the present invention. This block comprises a single cup-like section 41 provided with a flat cover plate 42. The side walls of the cup-like section 41 are formed around the rim of the section with a continuous recess 43 adapted to receive the cover plate 42 therein. The inner surfaces of the walls of the cup-like section 41 may be colored as at 44 and the inner surface of the cover plate 42 likewise provided with a color coat 45. The bottom and side walls of the recess 43 as well as the peripheral edges of the cover plate 42 are also adapted to be colored as at 46 or these portions only may be colored as explained above. After the coloring material has been applied to the sections 41 and 42, the said sections are properly assembled with one another and then placed in a furnace such as shown in Fig. 8, wherein the coloring material is adapted to be fired upon the glass and the two sections simultaneously secured together through the medium of the coloring material 46 at the edge portions thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A glass building block composed of two sections joined together at the edge portions thereof to provide a hollow sealed unit, and a coating of colored ceramic enamel adherent to said edge portions for securing said sections to one another and being visible through the walls thereof.

2. A glass building block composed of two sections joined together at the edge portions thereof to provide a hollow sealed unit, a coating of colored ceramic enamel adherent to said edge portions for securing said sections to one another and being visible through the walls thereof, and a coating of colored ceramic enamel also adherent to and covering the inner surfaces of said sections.

JOHN L. DRAKE.